(12) United States Patent
Jung et al.

(10) Patent No.: US 12,540,123 B2
(45) Date of Patent: Feb. 3, 2026

(54) PROCESS FOR PREPARING ISOINDOLINONE DERIVATIVE, NOVEL INTERMEDIATES USED FOR THE PROCESS, AND A PROCESS FOR PREPARING THE INTERMEDIATES

(71) Applicant: CNG Bio Co., Ltd., Chungcheongbuk-do (KR)

(72) Inventors: Jae-kyung Jung, Chungcheongbuk-do (KR); Mi Kyeong Lee, Chungcheongbuk-do (KR); Vishwanath Manjunatha, Chungcheongbukdo (KR); Dae-Hee Lee, Chungcheongbuk-do (KR); Jae-Kang Lee, Chungcheongbuk-do (KR)

(73) Assignee: CNG Bio Co., Ltd., Chungcheongbuk-do (KR)

( * ) Notice: Subject to any disclaimer, the term of this patent is extended or adjusted under 35 U.S.C. 154(b) by 882 days.

(21) Appl. No.: 17/782,500

(22) PCT Filed: Dec. 3, 2020

(86) PCT No.: PCT/KR2020/017517
§ 371 (c)(1),
(2) Date: Jun. 3, 2022

(87) PCT Pub. No.: WO2021/112574
PCT Pub. Date: Jun. 10, 2021

(65) Prior Publication Data
US 2023/0042112 A1 Feb. 9, 2023

(30) Foreign Application Priority Data

Dec. 3, 2019 (KR) .................. 10-2019-0159421

(51) Int. Cl.
*C07D 265/16* (2006.01)
*C07D 209/46* (2006.01)

(52) U.S. Cl.
CPC ......... *C07D 265/16* (2013.01); *C07D 209/46* (2013.01)

(58) Field of Classification Search
CPC .................................................. C07D 265/16
See application file for complete search history.

(56) References Cited

FOREIGN PATENT DOCUMENTS

| JP | 2012077030 A | 4/2012 |
|---|---|---|
| KR | 20130118131 A | 10/2013 |
| KR | 20140082052 A | 7/2014 |
| KR | 101896398 B1 | 9/2018 |

OTHER PUBLICATIONS

Mun, Bohyun, et al., "Total Synthesis of Isohericerin, Isohericenone, and Erinacerin A: Development of a Copper-Catalyzed Methylboronation of Terminal Alkynes", The Journal of Organic Chemistry, 2017, vol. 82, No. 12, pp. 6349-6357.

Yuan, Junying, et al., "Apoptosis in the Nervous System", Nature, vol. 407, Oct. 12, 2000, pp. 802-809.

*Primary Examiner* — Paul V Ward
(74) *Attorney, Agent, or Firm* — Servilla Whitney LLC

(57) ABSTRACT

The present invention relates to a process for preparing an isoindolinone derivative represented by Formula 1, novel intermediates used for the process and a process for preparing the intermediates.

14 Claims, 13 Drawing Sheets

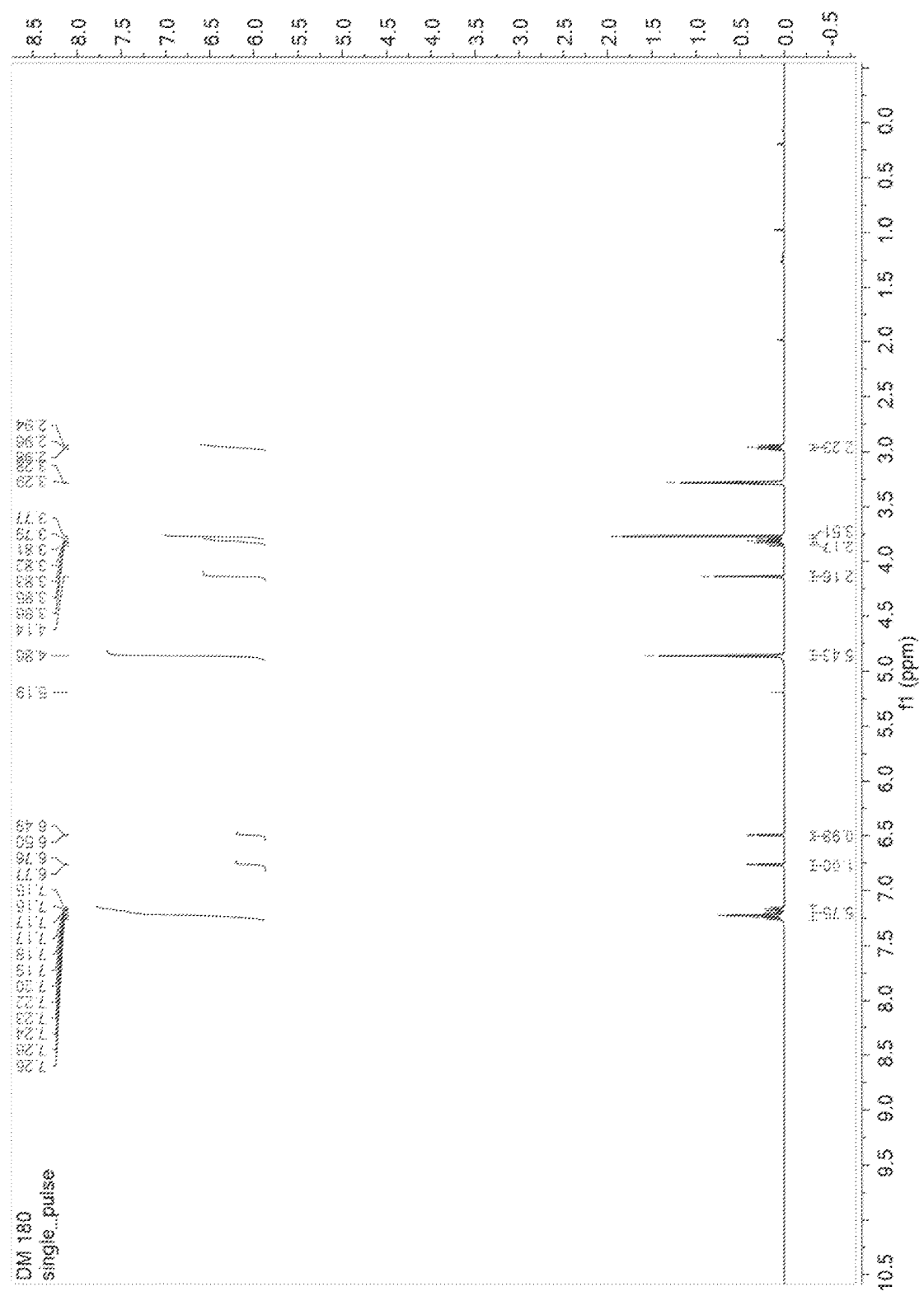

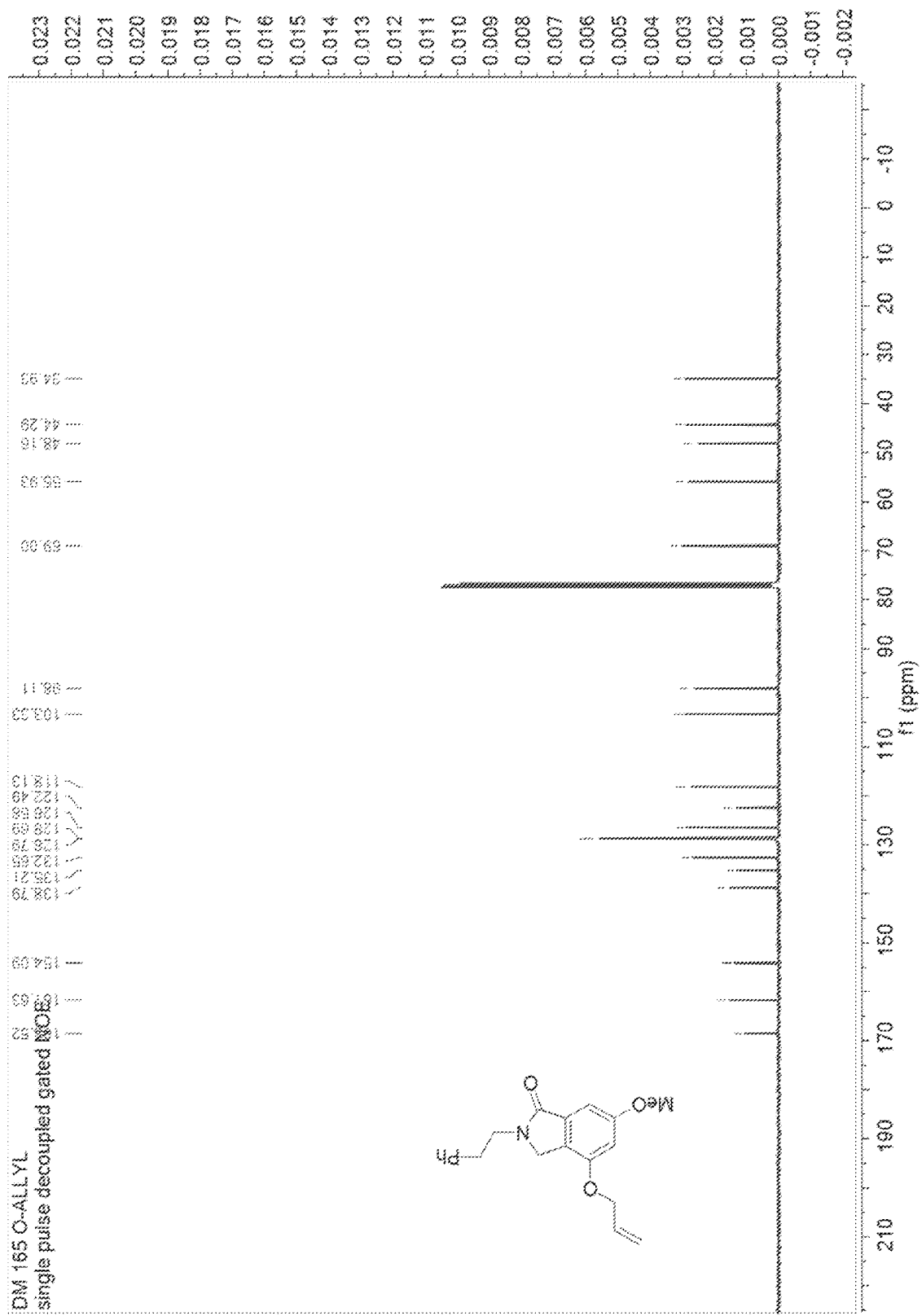

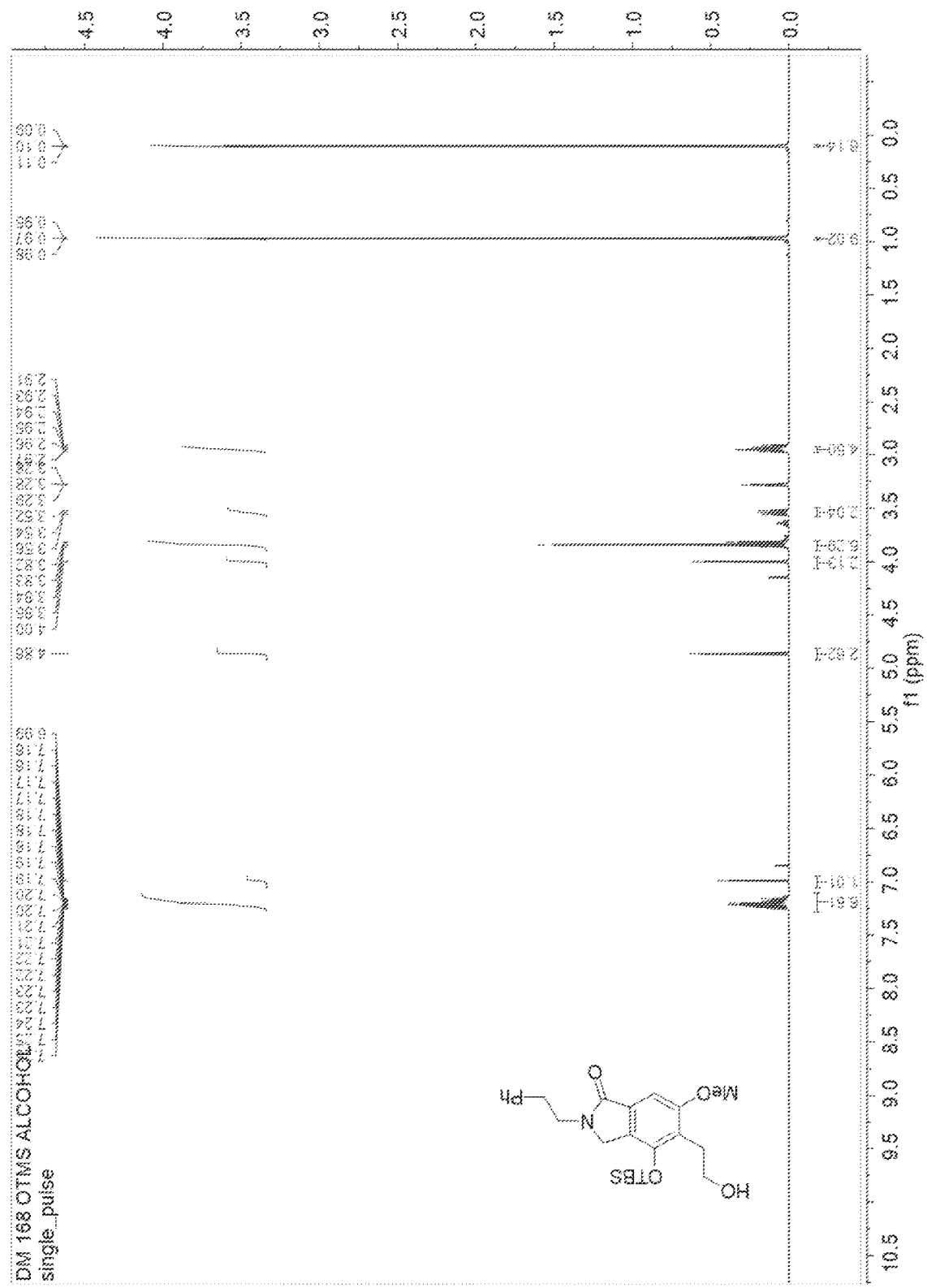

PROCESS FOR PREPARING ISOINDOLINONE DERIVATIVE, NOVEL INTERMEDIATES USED FOR THE PROCESS, AND A PROCESS FOR PREPARING THE INTERMEDIATES

CROSS-REFERENCE TO RELATED APPLICATIONS

This application is a National Phase entry of International Application No. PCT/KR2020/017517, filed on Dec. 3, 2020, which claims priority to Korean Application Serial No. 10-2019-0159421, filed on Dec. 3, 2019, the disclosures of which are hereby incorporated herein by reference in their entireties.

TECHNICAL FIELD

The present invention relates to a process for preparing an isoindolinone derivative represented by Formula 1, novel intermediates used for the process and a process for preparing the intermediates.

[Formula 1]

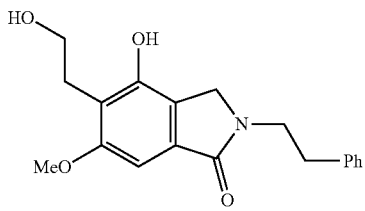

BACKGROUND ART

With the recent rapid increase in the elderly population and the increase in the number of patients with various neurodegenerative diseases, interest in treatment and prevention of the neurodegenerative diseases is increasing. Neurodegenerative disease is a disease that causes various conditions such as motor disturbance, defects of memory, and cognitive disorder due to the decrease or loss of nerve cell function. A large number of nerve cells die every day not only in the brain of patients with neurological diseases but also in the brain of normal adults, and the number of nerve cells that die with aging increases exponentially (Yuan and Yankner, Nature. 407, 802-809, 2000).

Major diseases belonging to neurodegenerative diseases include Alzheimer's disease, Parkinson's disease, Lou Gehrig's disease, Huntington's disease and the like, and the pathogenesis of the disease has not been fully found until now. As a therapeutic agent for Alzheimer's disease, an acetylcholinesterase inhibitor or an NMDA (N-methyl-D-aspartate) receptor antagonist or the like is used, and as a therapeutic agent for Parkinson's disease, L-dopa, a dopamine agonist, an MAO-B inhibitor or a COMT inhibitor or the like is used, and a therapeutic agent for Huntington's disease includes a dopamine D2 receptor and the like. However, since all of the therapeutic agents target neurotransmission processes, a method of using the therapeutic agents is not a fundamental treatment, but only alleviates symptoms. Therefore, there is still a need for novel drugs capable of fundamentally treating neurodegenerative diseases. Korean Patent Registration No. 1896398 discloses a substance capable of treating neurodegenerative diseases by inhibiting the death of nerve cells.

A compound of Formula 1 below is a novel compound useful in the treatment of neurological diseases by exhibiting the activity of promoting the production of nerve growth factors.

[Formula 1]

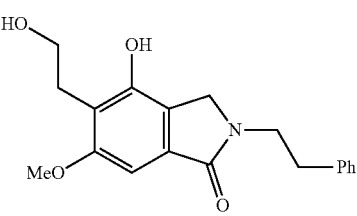

The compound is isolated from the extract of *Hericium erinaceus* mushroom, and can be used as a fundamental therapeutic agent for the disease by promoting the growth of nerve growth factors in neurological diseases including neurodegenerative diseases. However, until now, there is no known process for preparing the compound.

Under this background, as a result of studying the synthesis of the compound, the present inventors developed a process for preparing the compound of Formula 1 and novel intermediates used for the process, and thus completed the present invention.

PRIOR ART DOCUMENT

Patent Document (Patent Document 0001) Korean Patent Registration No. 1896398

DESCRIPTION OF THE INVENTION

Technical Problem

An object of the present invention is to provide novel compounds used in the synthesis of the compound of Formula 1.

An object of the present invention is to provide a process for preparing the novel compound.

An object of the present invention is to provide a process for preparing the compound of Formula 1 using the novel compound.

Solution to Problem

The present invention provides compounds of Formulae 2 to 5 below.

[Formula 2]

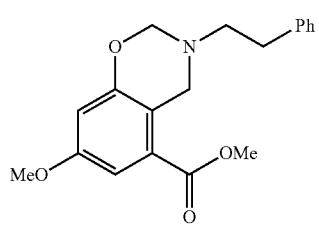

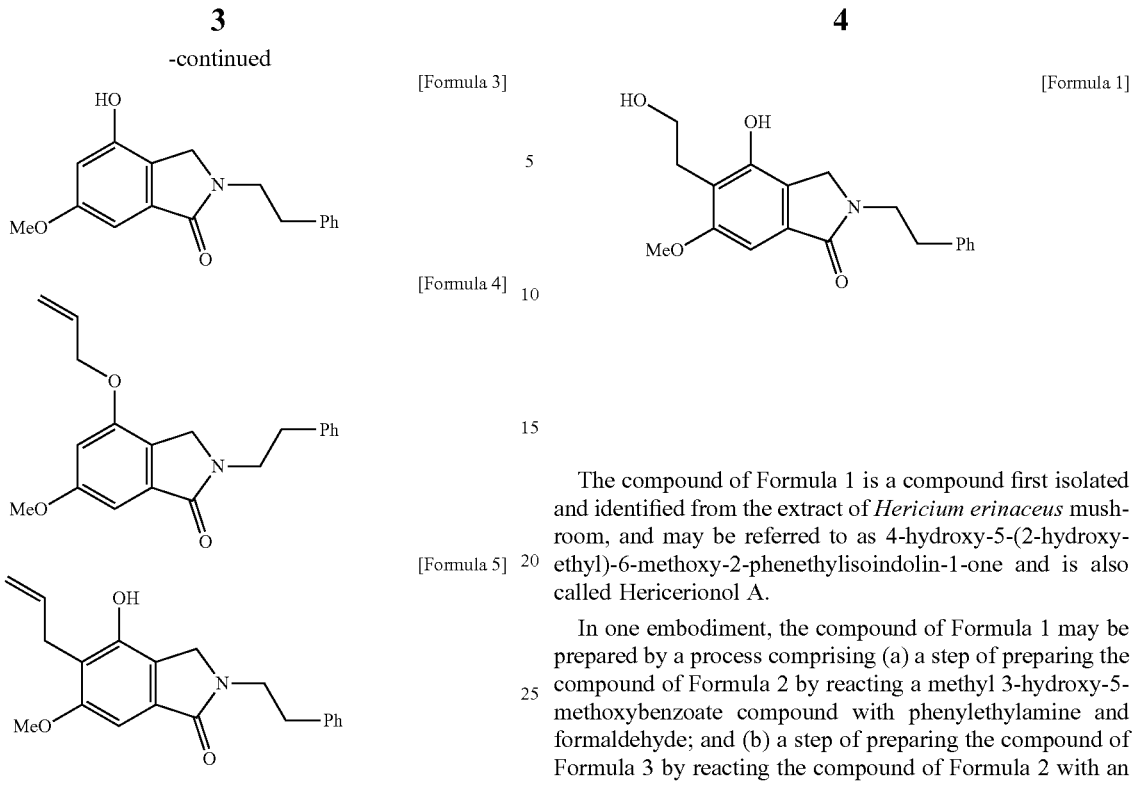

The present invention also provides a process for preparing the compound of Formula 2.

In one embodiment, the compound of Formula 2 may be prepared by performing a Mannich reaction on a methyl 3-hydroxy-5-methoxybenzoate compound. For example, the Mannich reaction may be a reaction of the methyl 3-hydroxy-5-methoxybenzoate compound with phenylethylamine and formaldehyde.

The present invention also provides a process for preparing the compound of Formula 3.

In one embodiment, the compound of Formula 3 may be prepared by reacting the compound of Formula 2 with an acid and then reacting with a base. The acid may be at least one selected from the group consisting of hydrochloric acid, sulfuric acid, phosphoric acid, nitric acid, sulfonic acid and p-toluenesulfonic acid, and the base may be an aqueous sodium hydroxide solution or an aqueous potassium hydroxide solution, but is not limited thereto. Preferably, the acid is hydrochloric acid, and the base is an aqueous sodium hydroxide solution.

The present invention also provides a process for preparing the compound of Formula 4.

In one embodiment, the compound of Formula 4 may be prepared by reacting the compound of Formula 3 with allyl halide. The allyl halide may be selected from the group consisting of allyl chloride, allyl bromide and allyl iodide, preferably allyl bromide.

The present invention also provides a process for preparing the compound of Formula 5.

In one embodiment, the compound of Formula 5 may be prepared by performing a Claisen rearrangement reaction on the compound of Formula 4, and the reaction may be performed, for example, under mesitylene.

The present invention provides a process for preparing a compound of Formula 1 below.

The compound of Formula 1 is a compound first isolated and identified from the extract of *Hericium erinaceus* mushroom, and may be referred to as 4-hydroxy-5-(2-hydroxyethyl)-6-methoxy-2-phenethylisoindolin-1-one and is also called Hericerionol A.

In one embodiment, the compound of Formula 1 may be prepared by a process comprising (a) a step of preparing the compound of Formula 2 by reacting a methyl 3-hydroxy-5-methoxybenzoate compound with phenylethylamine and formaldehyde; and (b) a step of preparing the compound of Formula 3 by reacting the compound of Formula 2 with an acid and then reacting with a base. In step (b), the acid may be at least one selected from the group consisting of hydrochloric acid, sulfuric acid, phosphoric acid, nitric acid, sulfonic acid and p-toluenesulfonic acid, and the base may be an aqueous sodium hydroxide solution or an aqueous potassium hydroxide solution, but is not limited thereto. Preferably, the acid is hydrochloric acid, and the base is an aqueous sodium hydroxide solution.

In another embodiment, after the step (b), the compound of Formula 1 may be prepared by a process further comprising (c) a step of preparing the compound of Formula 4 by reacting the compound of Formula 3 with allyl halide. The allyl halide may be selected from the group consisting of allyl chloride, allyl bromide and allyl iodide, preferably, allyl bromide.

In another embodiment, after the step (c), the compound of Formula 1 may be prepared by a process further comprising (d) a step of preparing the compound of Formula 5 by performing a Claisen rearrangement reaction on the compound of Formula 4. In this case, the Claisen rearrangement reaction may be performed, for example, under mesitylene.

In another embodiment, after the step (d), the compound of Formula 1 may be prepared by a process further comprising (e) a step of preparing a compound of Formula 6 below by attaching a protecting group to a hydroxy group of the compound of Formula 5; (f) a step of preparing a compound of Formula 7 below by performing an oxidation reaction on the compound of Formula 6 below; (g) a step of preparing a compound of Formula 8 below by performing a reduction reaction on the compound of Formula 7 below; and (h) a step of preparing the compound of Formula 1 by performing a deprotection reaction on the compound of Formula 8 below. The oxidation reaction of step (f) may be performed in the presence of $OsO_4$ or $NaIO_4$. The reduction reaction of step (g) may be performed in the presence of a suitable reducing agent, such as $NaBH_4$.

[Formula 6]

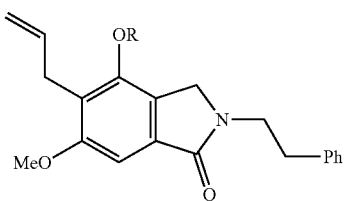

[Formula 7]

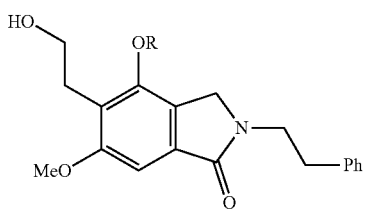

[Formula 8]

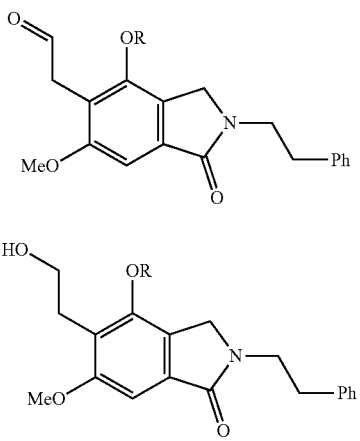

In which, R represents a benzoyl group, an acetyl group, a methoxymethyl group, an ethoxyethyl group, a methylthiomethyl group, a tert-butyl group, an allyl group, a tert-butyldimethylsilyl group, a tert-butyldiphenylsilyl group, a pivaloyl group, or a (3-methoxyethoxymethyl group as a protecting group.

When the protecting group R is a tert-butyldimethylsilyl group, the compound of Formula 6, the compound of Formula 7, and the compound of Formula 8 are represented by Formula 6a, Formula 7a, and Formula 8a, respectively.

[Formula 6a]

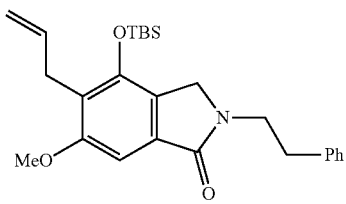

[Formula 7a]

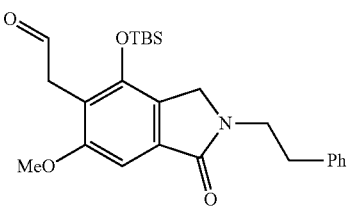

[Formula 8a]

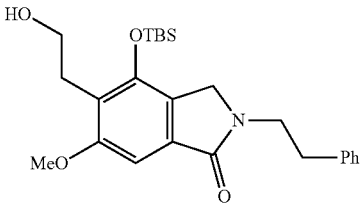

The reaction of attaching a protecting group to a hydroxy group of step (e) above and the deprotection reaction of step (h) above may be performed by using methods commonly used in the art.

As used herein, the term "deprotection reaction" refers to a reaction of recovering a hydroxy group by removing a protecting group bonded with a hydroxy group to protect a hydroxy group, which is a reactive group.

In one embodiment, in the reaction of attaching a hydroxy protecting group of step (e) above, a benzoyl group, an acetyl group, a methoxymethyl group, an ethoxyethyl group, a methylthiomethyl group, a tert-butyl group, an allyl group, a tert-butyldimethylsilyl group, a tert-butyldiphenylsilyl group, a pivaloyl group, or a β-methoxyethoxymethyl group may be used, but is not limited thereto.

In one embodiment, in the deprotection reaction of step (h) above, for example, tetra-n-butylammonium fluoride may be used.

A process for preparing a compound of Formula 1 may include the following steps:
(a) a step of preparing a compound of Formula 2 by reacting a methyl 3-hydroxy-5-methoxybenzoate compound with phenylethylamine and formaldehyde;
(b) a step of preparing a compound of Formula 3 by reacting the compound of Formula 2 with an acid and then reacting with a base;
(c) a step of preparing a compound of Formula 4 by reacting the compound of Formula 3 with allyl halide;
(d) a step of preparing a compound of Formula 5 by performing a Claisen rearrangement reaction on the compound of Formula 4;
(e) a step of preparing a compound of Formula 6 by attaching a protecting group to a hydroxy group of the compound of Formula 5;
(f) a step of preparing a compound of Formula 7 by performing an oxidation reaction on the compound of Formula 6;
(g) a step of preparing a compound of Formula 8 by performing a reduction reaction on the compound of Formula 7; and
(h) a step of preparing a compound of Formula 1 by performing a deprotection reaction on the compound of Formula 8.

In one embodiment, the compound of Formula 1 may be prepared by Scheme 1 below.

[Scheme 1]

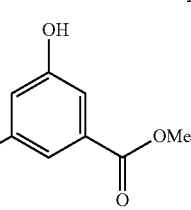 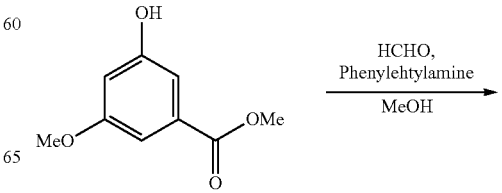

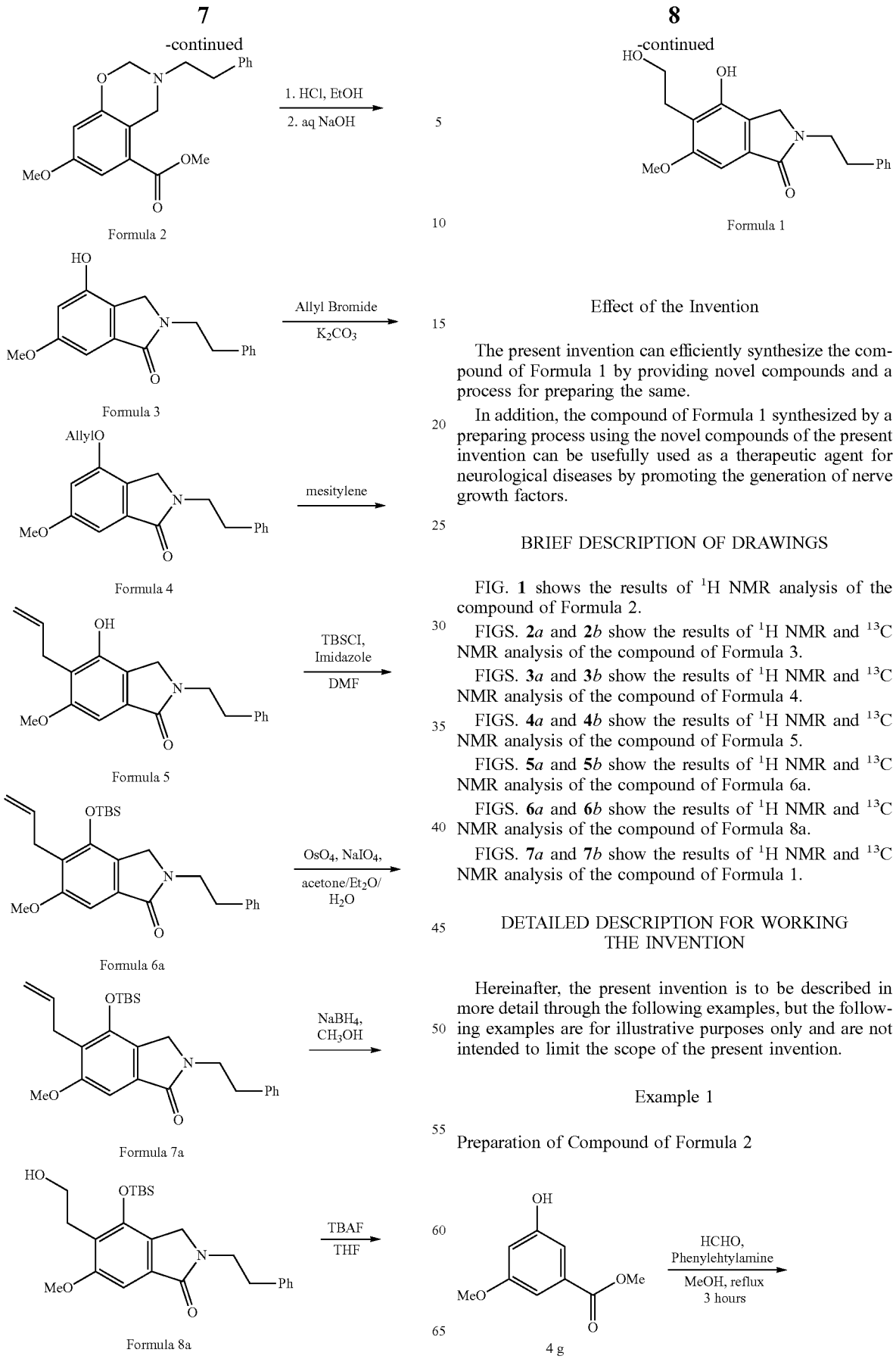

Effect of the Invention

The present invention can efficiently synthesize the compound of Formula 1 by providing novel compounds and a process for preparing the same.

In addition, the compound of Formula 1 synthesized by a preparing process using the novel compounds of the present invention can be usefully used as a therapeutic agent for neurological diseases by promoting the generation of nerve growth factors.

BRIEF DESCRIPTION OF DRAWINGS

FIGS. 2a and 2b show the results of $^1$H NMR and $^{13}$C NMR analysis of the compound of Formula 3.

FIGS. 3a and 3b show the results of $^1$H NMR and $^{13}$C NMR analysis of the compound of Formula 4.

FIGS. 5a and 5b show the results of $^1$H NMR and $^{13}$C NMR analysis of the compound of Formula 6a.

FIGS. 6a and 6b show the results of $^1$H NMR and $^{13}$C NMR analysis of the compound of Formula 8a.

DETAILED DESCRIPTION FOR WORKING THE INVENTION

Figure 1:
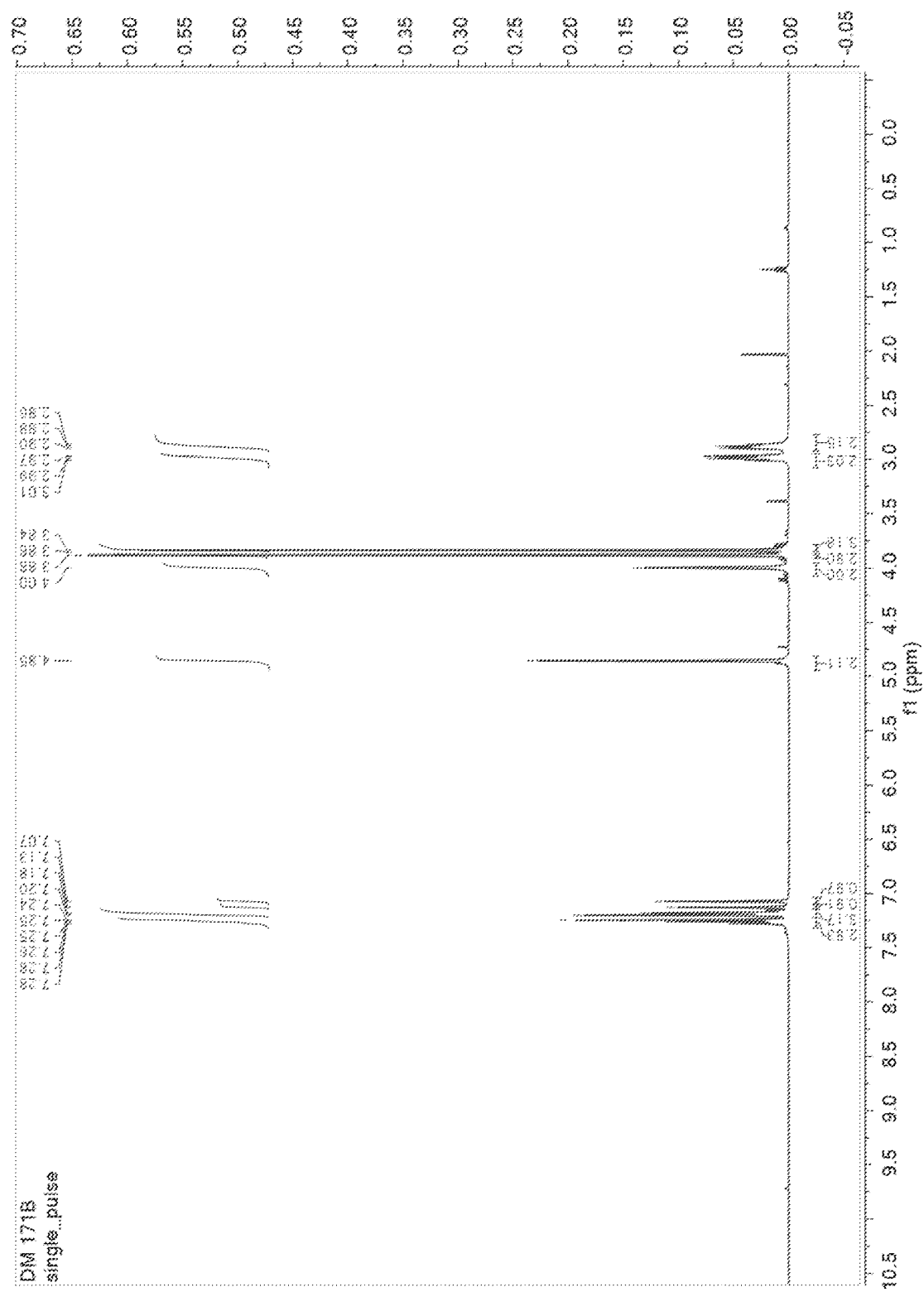
FIG. 1 shows the results of $^1$H NMR analysis of the compound of Formula 2.
Figure 2B:
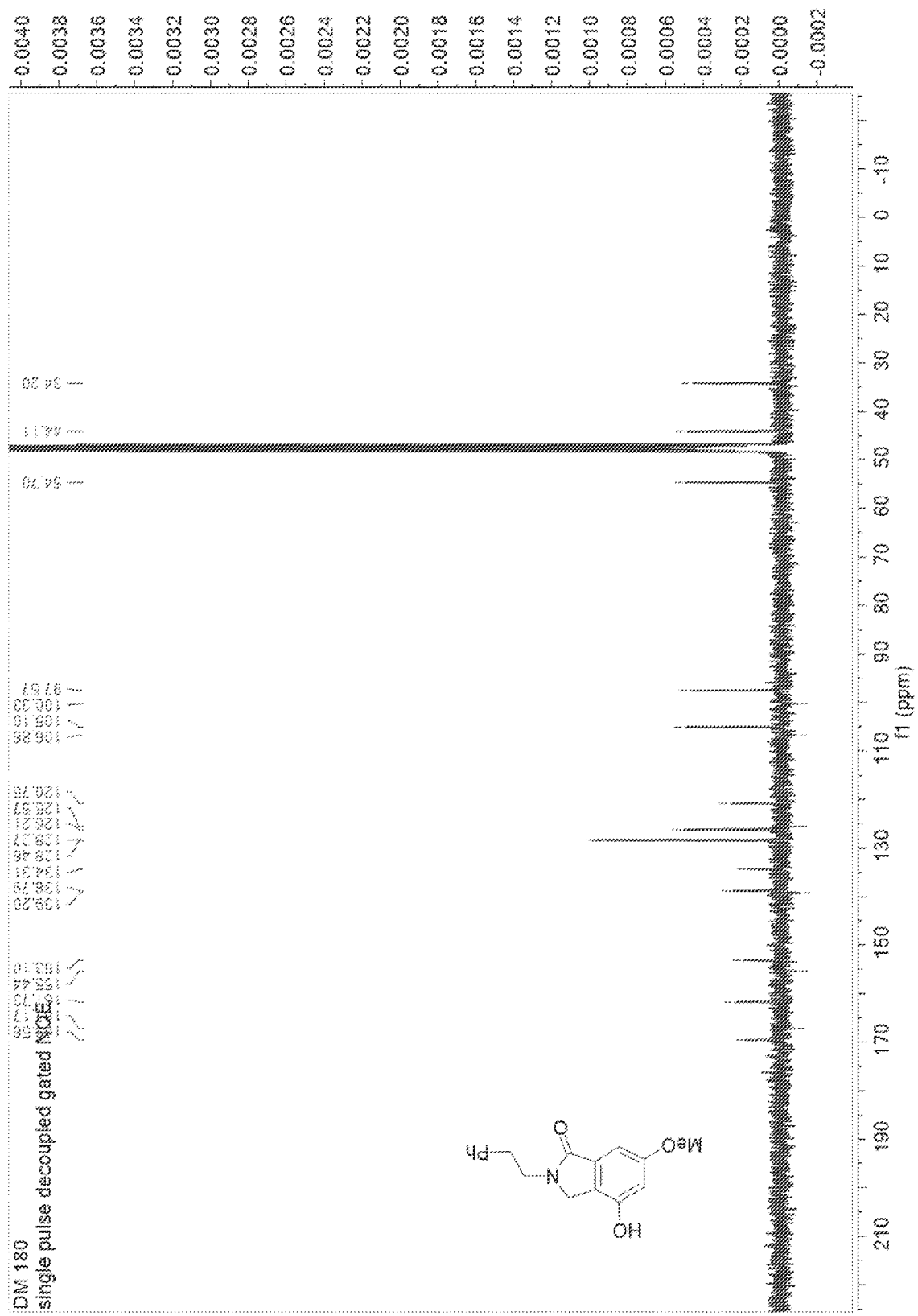
Figure 3A:
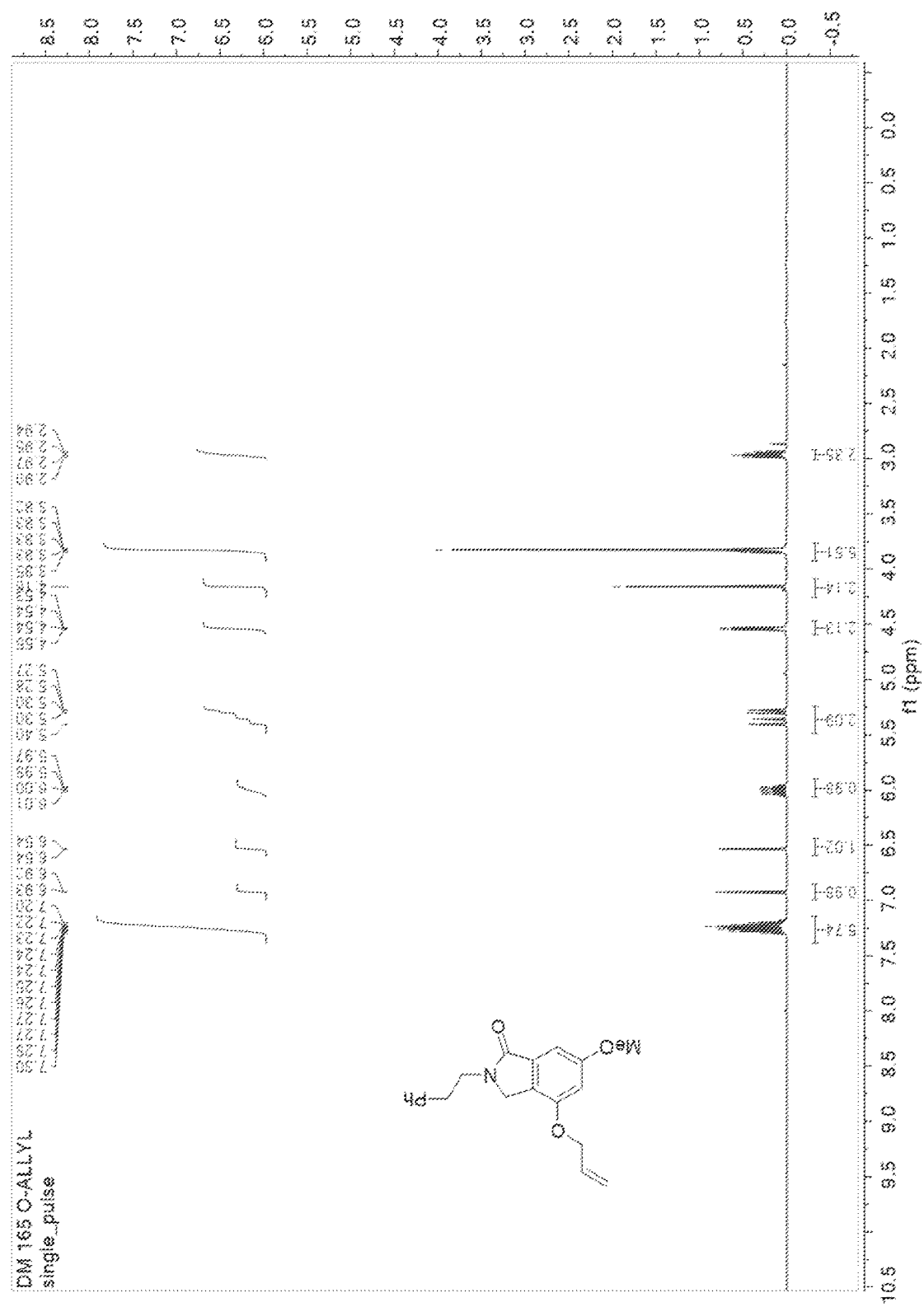
Figure 4A:
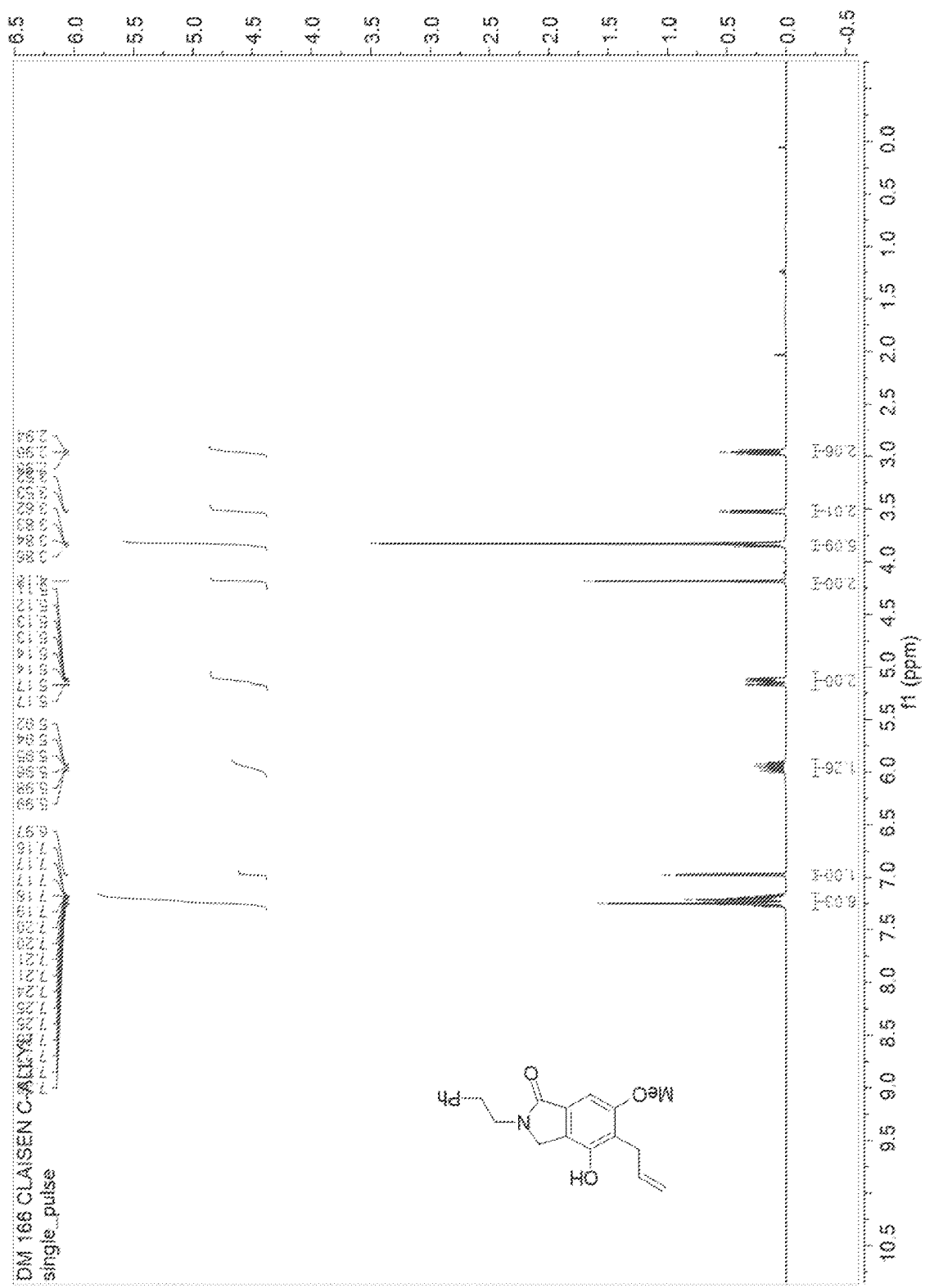
FIGS. 4a and 4b show the results of $^1$H NMR and $^{13}$C NMR analysis of the compound of Formula 5.
Figure 4B:
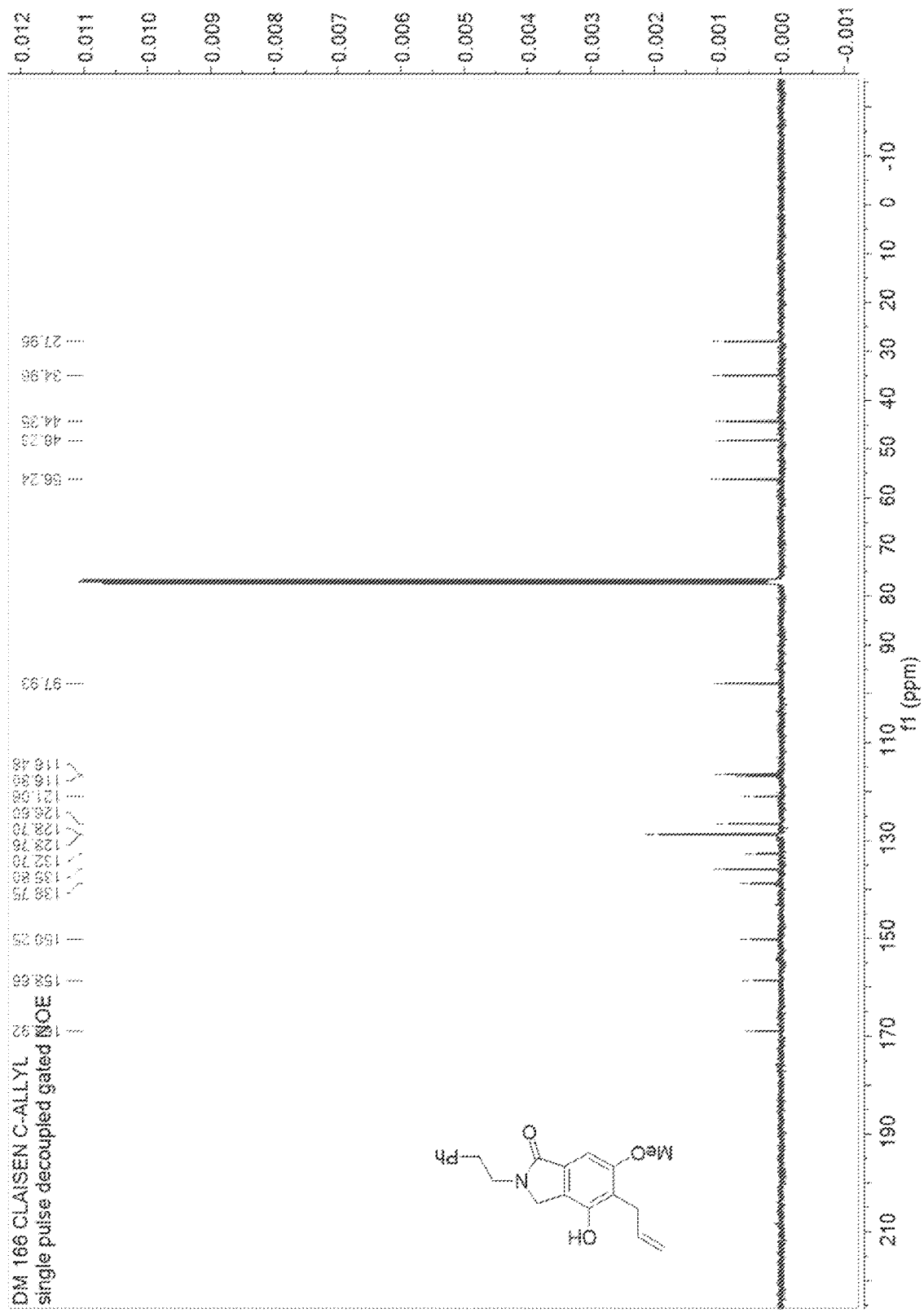
Figure 5A:
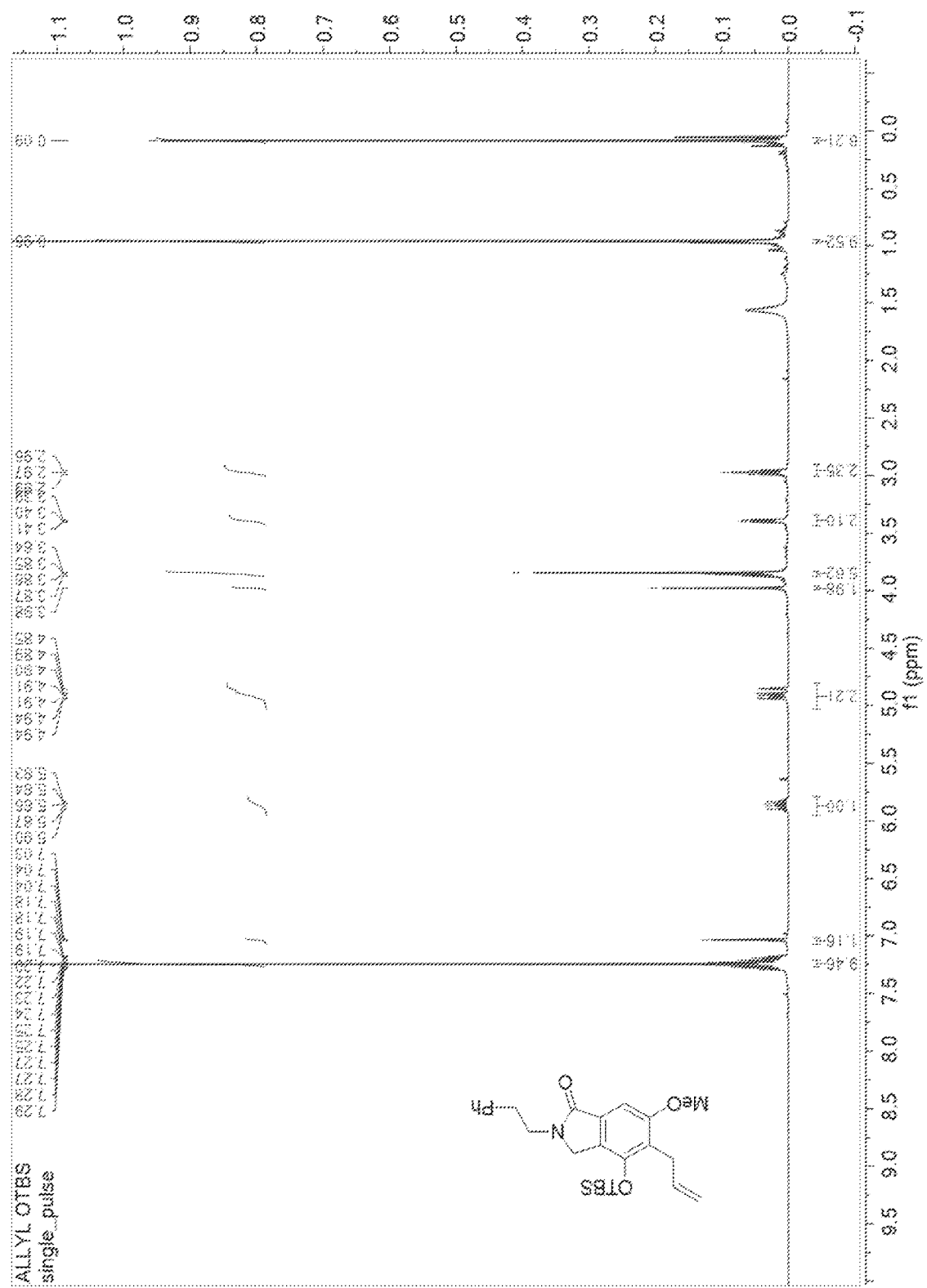
Figure 5B:
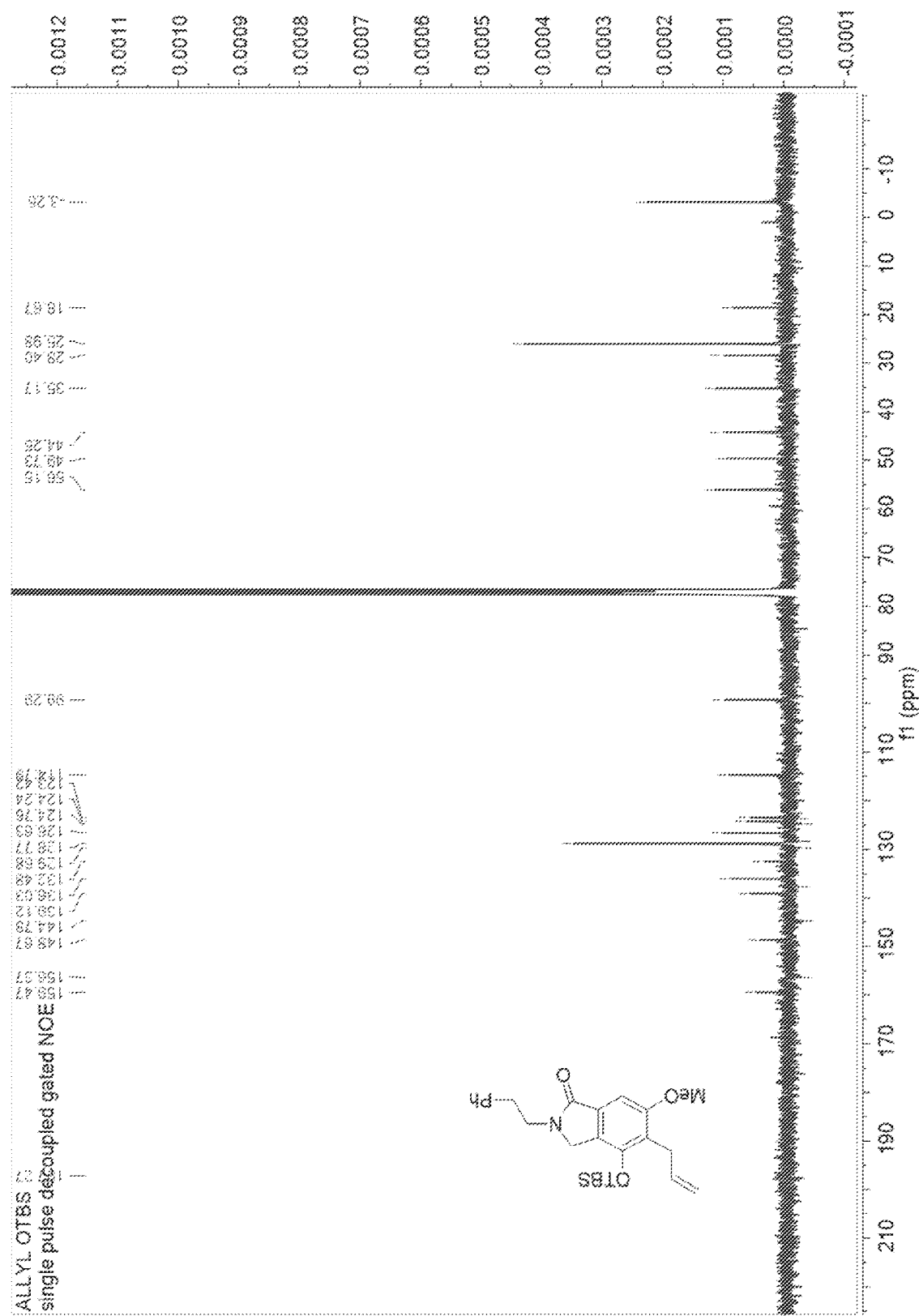
Figure 6B:
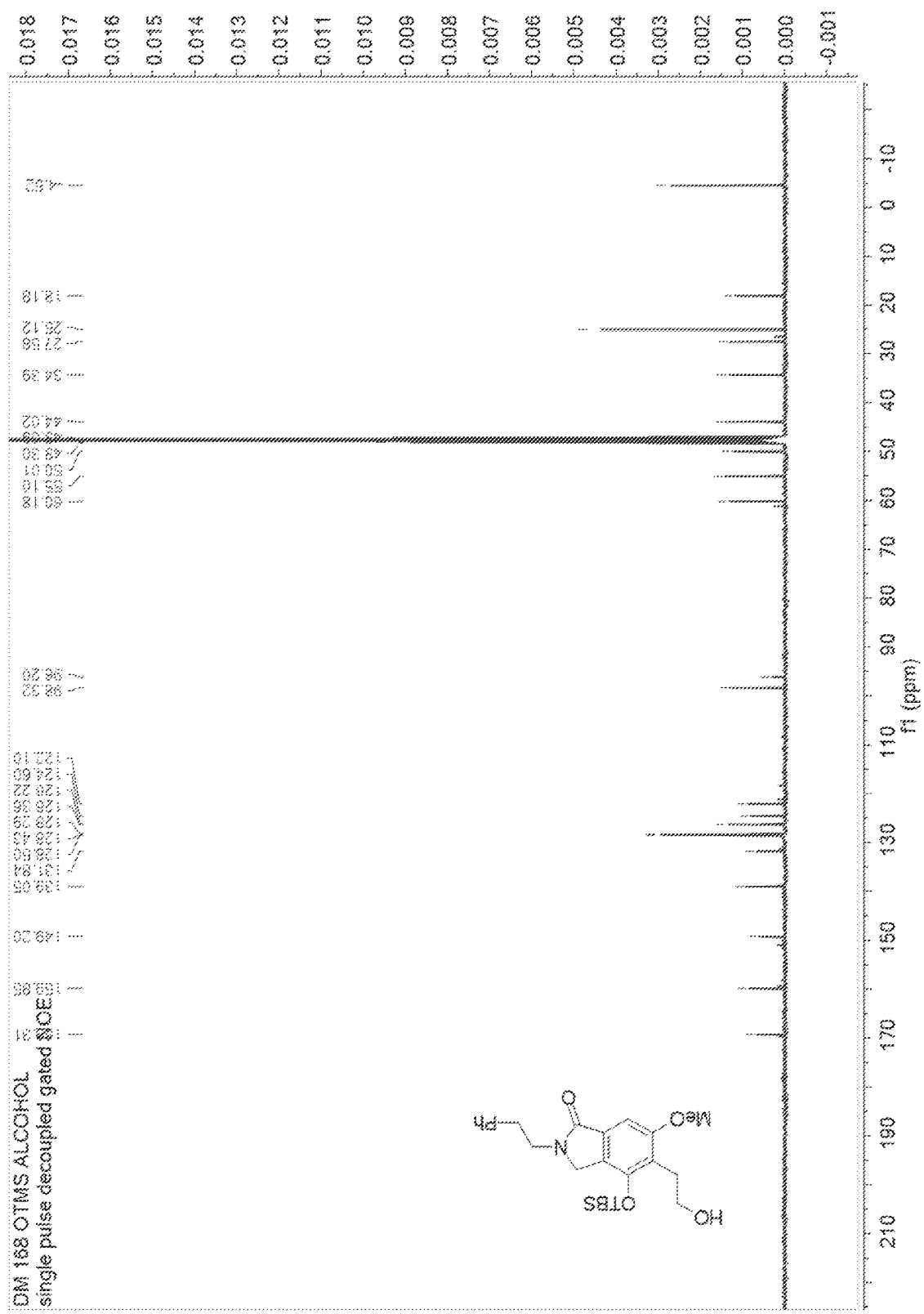
Figure 7A:
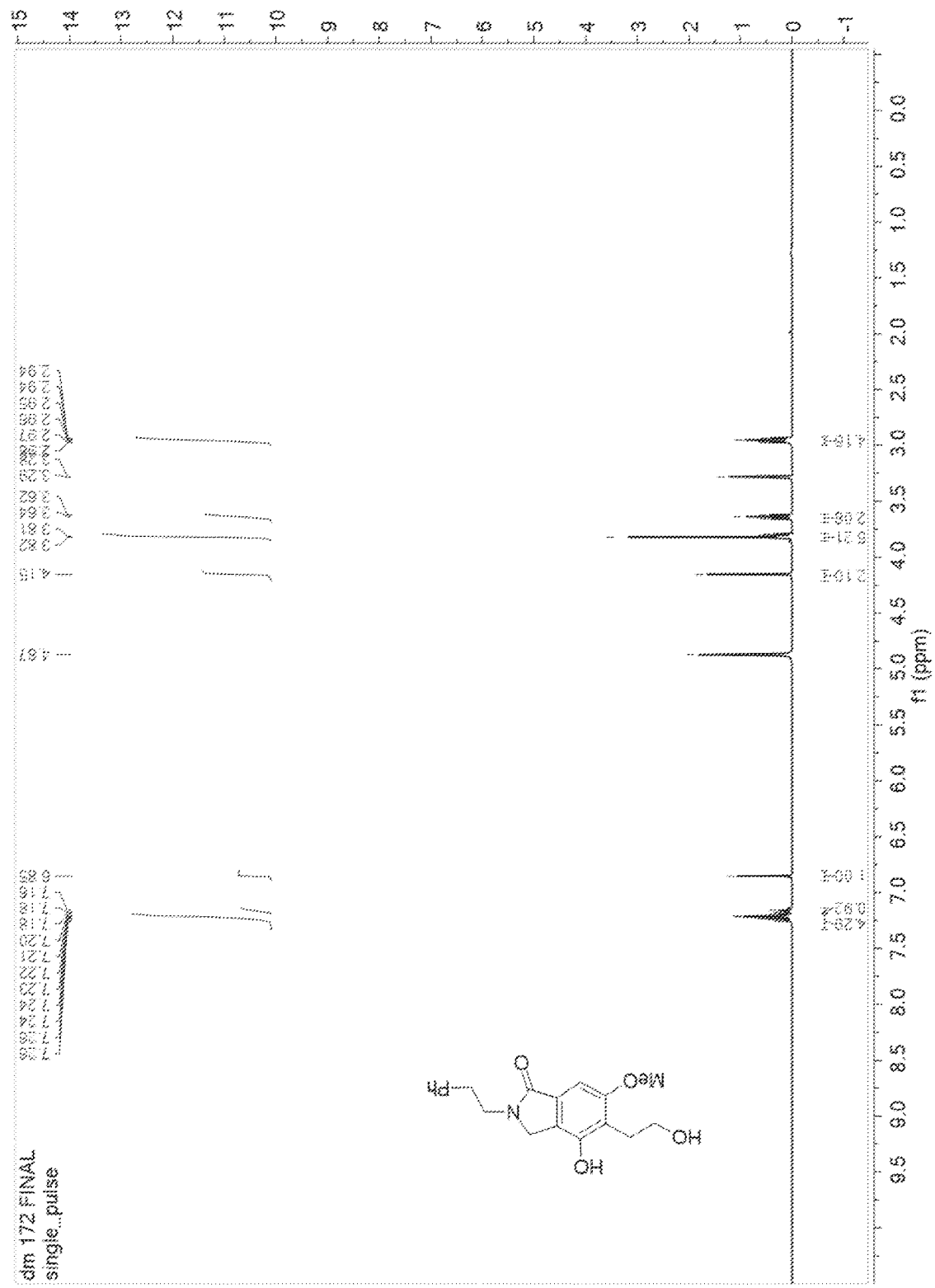
FIGS. 7a and 7b show the results of $^1$H NMR and $^{13}$C NMR analysis of the compound of Formula 1.
Figure 7B:
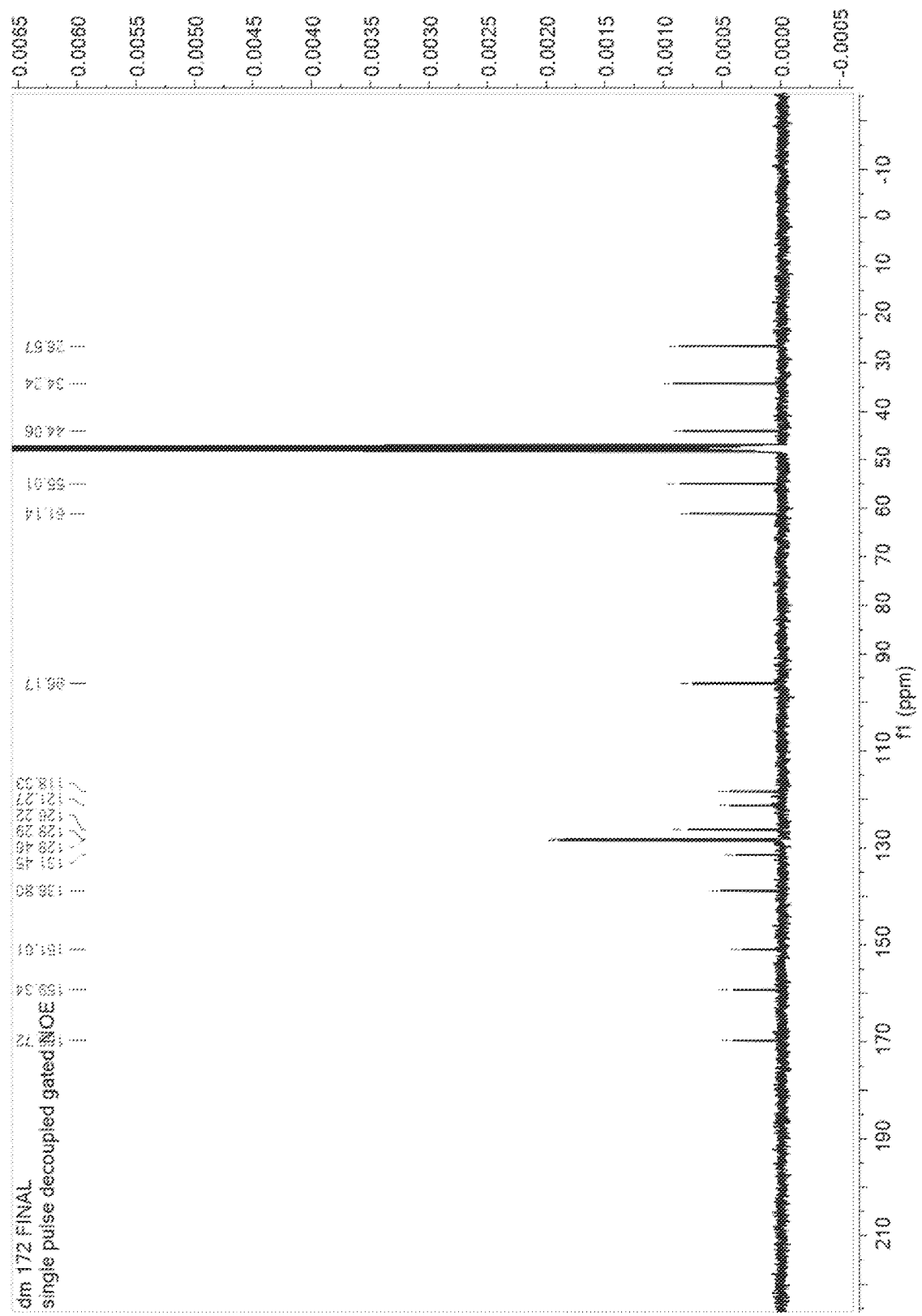

Hereinafter, the present invention is to be described in more detail through the following examples, but the following examples are for illustrative purposes only and are not intended to limit the scope of the present invention.

Example 1

Preparation of Compound of Formula 2

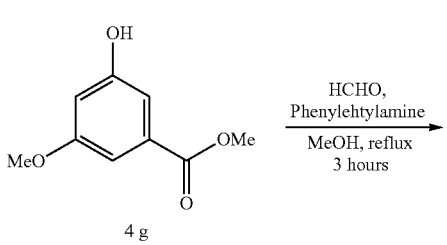

-continued

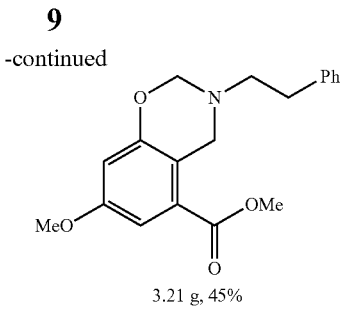

3.21 g, 45%

To a solution of methyl 3-hydroxy-5-methoxybenzoate (4.0 g, 21.98 mmol) in methanol (10 ml), phenylethylamine (4.0 mL, 33.03 mmol) was added, and 30% formaldehyde solution (4.0 mL) was added dropwise at room temperature. Thereafter, the temperature of the reaction mixture was elevated up to 60° C. and stirred for 3 hours. After the reaction was completed (confirmed by TLC), the reaction mixture was cooled to room temperature and quenched by slowly adding a saturated aqueous sodium hydrogen carbonate solution. The aqueous layer was extracted three times with EtOAc, and the combined organic layer was washed with brine, and dried over sodium sulfate, evaporated to dryness, and then purified by column chromatography to obtain methyl 7-methoxy-3-phenethyl-3,4-dihydro-2H-benzo[e][1,3]oxazine-5-carboxylate (3.21 g, 45%) represented by Formula 2 as a yellow oil.

$^1$H NMR (400 MHz) δ 7.32-7.23 (m, 2H), 7.19 (d, J=7.3 Hz, 3H), 7.13 (s, 1H), 7.07 (s, 1H), 4.85 (s, 2H), 4.00 (s, 2H), 3.88 (s, 3H), 3.84 (s, 3H), 3.08-2.95 (m, 2H), 2.93-2.77 (m, 2H).

Example 2

Preparation of Compound of Formula 3

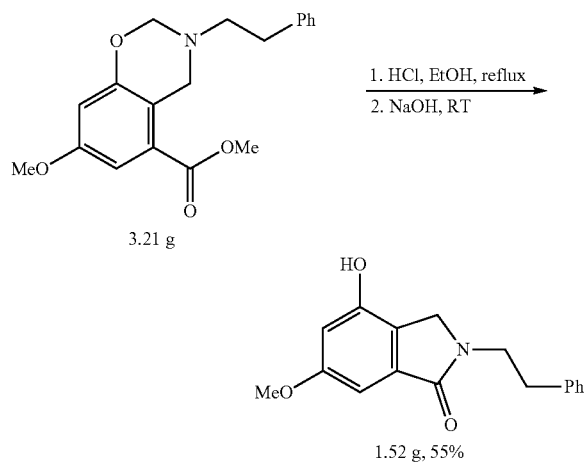

Methyl 7-methoxy-3-phenethyl-3,4-dihydro-2H-benzo[e][1,3]oxazine-5-carboxylate (3.21 g, 9.82 mmol) represented by Formula 2 was added to ethanol at room temperature, and HCl was added dropwise to the reaction mixture heated to reflux for 3 hours. After confirming that the starting material disappeared, the reaction mixture was cooled to 0° C., and an aqueous sodium hydroxide solution was added until the pH reached 8, and then the reaction mixture was stirred at room temperature for 2 hours. The reaction was quenched with brine (30 mL) and washed with CHCl₃ (3×30 mL). The organic layers were combined, dried over MgSO₄, filtered and then concentrated. The crude product was purified by column chromatography to obtain 4-hydroxy-6-methoxy-2-phenethylisoindolin-1-one (1.52 g, 55%) represented by Formula 3, the desired compound, as a white solid.

$^1$H NMR (400 MHz) δ 7.27-7.13 (m, 5H), 6.76 (d, J=2.1 Hz, 1H), 6.50 (d, J=2.1 Hz, 1H), 4.14 (s, 2H), 3.81 (dd, J=9.3, 5.2 Hz, 2H), 3.77 (s, 3H), 2.96 (t, J=7.3 Hz, 2H). $^{13}$C NMR (101 MHz) δ 169.56, 161.73, 153.10, 138.79, 134.31, 128.46, 128.27, 126.21, 120.75, 105.10, 97.57, 54.70, 44.11, 34.20.

Example 3

Preparation of Compound of Formula 4

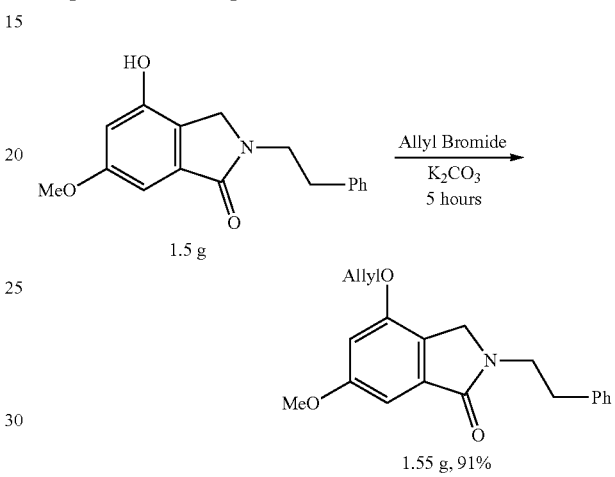

Potassium carbonate (2.5 equiv) was added to a DMF solution of 4-hydroxy-6-methoxy-2-phenethylisoindolin-1-one (1.50 g, 5.30 mmol) represented by Formula 3, and then allyl bromide (1.27 g, 10.60 mmol) was added dropwise at room temperature. The reaction mixture was stirred at room temperature for 5 hours. The reaction was quenched by adding a saturated aqueous NaHCO₃ solution (30 mL), and then washed with CHCl₃ (3×30 mL). The combined organic layer was dried over MgSO₄, filtered and then concentrated. The crude product was purified by silica gel column chromatography (hexane/Et₂O, 20:1) to obtain 4-(allyloxy)-6-methoxy-2-phenethylisoindolin-1-one (1.55 g, 91%) represented by Formula 4 as a white solid.

$^1$H NMR (400 MHz) δ 7.39-7.14 (m, 5H), 6.92 (d, J=1.9 Hz, 1H), 6.54 (d, J=2.0 Hz, 1H), 6.06-5.90 (m, 1H), 5.33 (ddd, J=13.9, 11.9, 1.4 Hz, 2H), 4.54 (dt, J=5.3, 1.5 Hz, 2H), 4.16 (s, 2H), 3.93-3.76 (m, 5H), 2.96 (dd, J=14.3, 7.1 Hz, 2H). $^{13}$C NMR (101 MHz) δ 168.52, 161.63, 154.09, 138.79, 135.21, 132.65, 128.80, 128.70, 126.58, 122.49, 118.13, 103.33, 98.11, 69.00, 55.93, 48.16, 44.29, 34.93.

Example 4

Preparation of Compound of Formula 5

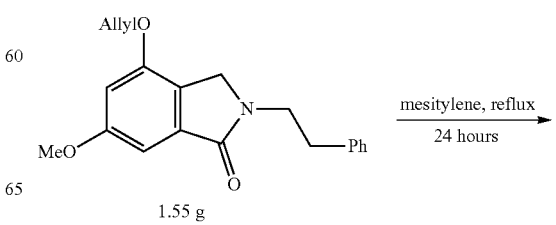

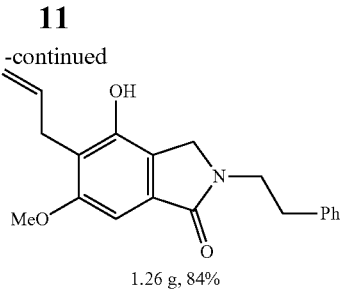

1.26 g, 84%

4-(allyloxy)-6-methoxy-2-phenethylisoindolin-1-one (1.55 g, 4.8 mmol) represented by Formula 4 was refluxed in mesitylene (10 ml) for one day. The cooled reaction mixture was concentrated in vacuo and then dissolved in AcOEt (30 ml). The combined organic layer was washed with a saturated aqueous NaCl solution (100 ml). The organic layer was dried over MgSO$_4$ and then concentrated. The crude product was purified by silica gel column using a mixture of AcOEt and hexane (1:3) as an eluent, and as a result, 5-allyl-4-hydroxy-6-methoxy-2-phenethylisoindolin-1-one (1.26 g, 84%) represented by Formula 5 as a white solid was obtain.

$^1$H NMR (400 MHz) δ 7.31-7.15 (m, 5H), 6.97 (s, 1H), 5.95 (ddt, J=16.2, 10.1, 6.1 Hz, 1H), 5.22-5.04 (m, 2H), 4.18 (s, 2H), 3.89-3.80 (m, 5H), 3.58-3.46 (m, 2H), 3.01-2.89 (m, 2H). $^{13}$C NMR (101 MHz) δ 168.92, 158.66, 150.25, 138.75, 135.80, 132.70, 128.76, 128.70, 126.60, 121.06, 116.80, 116.48, 97.93, 56.24, 48.23, 44.35, 34.96, 27.96.

Example 5

Preparation of Compound of Formula 6a

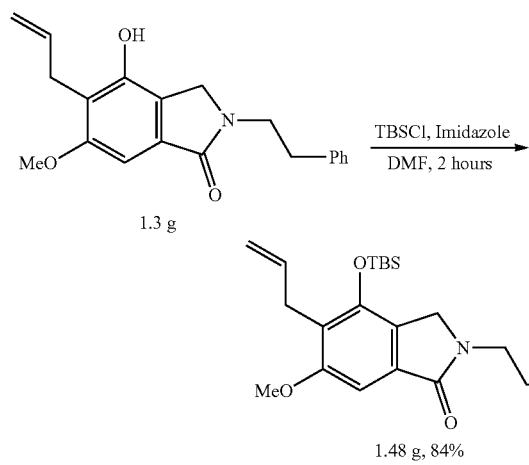

Tert-butyldimethylchlorosilane (1.20 g, 8.04 mmol) was added to a solution of 5-allyl-4-hydroxy-6-methoxy-2-phenethylisoindolin-1-one (1.3 g, 4.02 mmol) represented by Formula 5 and 1H imidazole (2.5 equiv) dissolved in DMF (25 mL). The reaction mixture was stirred at room temperature for 2 hours. Thereafter, the reaction was quenched by adding a saturated aqueous NaHCO$_3$ solution, and washed with CH$_2$Cl$_2$ (3×30 mL). The combined organic layer was dried over MgSO$_4$, filtered and then concentrated. The crude compound was purified by silica gel column chromatography (hexane/Et$_2$O, 20:1) to obtain 5-allyl-4-((tert-butyldimethylsilyl)oxy)-6-methoxy-2-phenethylisoindolin-1-one (1.48 g, 84%) represented by Formula 6a as a white solid.

$^1$H NMR (400 MHz) δ 7.27-7.21 (m, 5H), 7.07-7.02 (m, 1H), 5.95-5.79 (m, 1H), 4.90 (ddd, J=18.8, 13.6, 1.8 Hz, 2H), 3.98 (s, 2H), 3.88-3.83 (m, 5H), 3.44-3.34 (m, 2H), 2.97 (t, J=7.0 Hz, 2H), 0.96 (s, 9H), 0.09 (s, 6H). $^{13}$C NMR (101 MHz) δ 168.72, 159.47, 148.67, 144.78, 139.12, 136.03, 132.48, 128.77, 126.63, 124.24, 123.24, 114.79, 99.29, 56.15, 49.73, 44.25, 35.17, 28.40, 25.98, 18.67, −3.26.

Example 6

Preparation of Compound of Formula 7a and Compound of Formula 8a

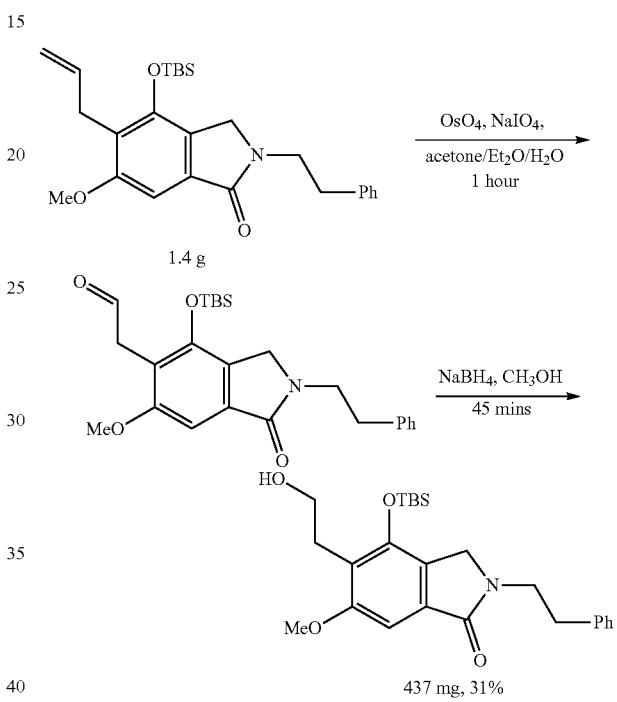

437 mg, 31%

5-allyl-4-((tert-butyldimethylsilyl)oxy)-6-methoxy-2-phenethylisoindolin-1-one (1.4 g, 1.20 mmol) represented by Formula 6a was dissolved in Et$_2$O (24 mL), and then to the solution, 0.05 M of an OsO$_4$ acetone solution (2.5 equiv) was added. The resulting dark brown solution was stirred for 1 hour, and water (24 mL) was added to the solution, and then fine powder of NaIO$_4$ (1.28 g, 6.0 mmol) was added in portions 5 times over 5 hours. The yellowish brown slurry was further stirred for 45 minutes and then diluted with Et$_2$O, and the layers were separated. The organic layer was washed with saturated brine, and dried over Na$_2$SO$_4$, and filtered and then concentrated in vacuo to obtain the crude product represented by Formula 7a.

The crude product was dissolved in CH$_3$OH (6.0 mL), cooled to 0° C., and then treated with NaBH$_4$ (1.36 g, 3.60 mmol). After 30 minutes, an excess hydride was quenched by adding 10% HCl, and the resulting mixture was extracted with Et$_2$O. The combined organic extract was washed with saturated brine, dried over Na$_2$SO$_4$, filtered through a SiO$_2$ plug (1.0 in.) on a Celite pad, and then concentrated in vacuo to obtain 4-((tert-butyldimethylsilyl)oxy)-5-(2-hydroxyethyl)-6-methoxy-2-phenethylisoindolin-1-one (437 mg, 31%) represented by Formula 8a as a white solid.

$^1$H NMR (400 MHz) δ 7.28-7.10 (m, 5H), 6.99 (s, 1H), 4.86 (s, 2H), 4.00 (s, 2H), 3.90-3.80 (m, 5H), 3.58-3.50 (m,

2H), 2.98-2.93 (m, 4H), 0.99-0.96 (m, 9H), 0.11-0.09 (m, 6H). $^{13}$C NMR (101 MHz) δ 169.31, 159.85, 149.20, 139.05, 131.84, 128.20, 126.29, 124.60, 122.10, 98.32, 96.20, 60.18, 55.10, 50.01, 44.02, 34.39, 27.58, 25.12, 18.18, −4.52.

Example 7

Preparation of Compound of Formula 1

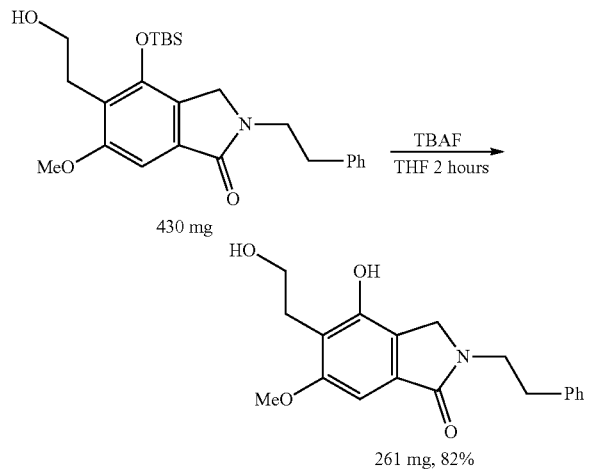

To a solution of 4-((tert-butyldimethylsilyl)oxy)-5-(2-hydroxyethyl)-6-methoxy-2-phenethylisoindolin-1-one (430 mg, 0.97 mmol) represented by Formula 8a in THF, a 1.0 M solution (1.46 mL) of tetra-n-butylammonium fluoride (1.46 mmol) in THF was added dropwise at 0° C. The solution was stirred for 2 hours at room temperature and then added to a saturated NH$_4$Cl solution. The mixture was extracted with Et$_2$O, and then the combined organic layer was dried over Na$_2$SO$_4$, filtered and then concentrated in vacuo to obtain an oil, which was purified by SiO$_2$ chromatography (50% EtOAc/hexane) to obtain 4-hydroxy-5-(2-hydroxyethyl)-6-methoxy-2-phenethylisoindolin-1-one (261 mg) represented by Formula 1 as a pale white solid.

$^1$H NMR (400 MHz) δ 7.34-7.19 (m, 5H), 7.19-7.14 (m, 1H), 6.85 (s, 1H), 4.15 (s, 2H), 3.86-3.79 (m, 5H), 3.64 (t, J=7.0 Hz, 2H), 2.96 (td, J=7.1, 1.8 Hz, 4H). $^{13}$C NMR (101 MHz) δ 169.72, 159.34, 151.01, 138.80, 131.45, 128.46, 128.29, 126.22, 121.27, 118.33, 96.17, 61.14, 55.01, 48.44, 44.06, 34.24, 26.57.

The invention claimed is:

1. A compound selected from the group consisting of Formula 2, Formula 3, Formula 4, and Formula 5 below:

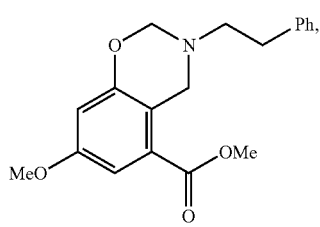

[Formula 2]

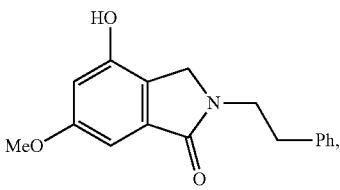

[Formula 3]

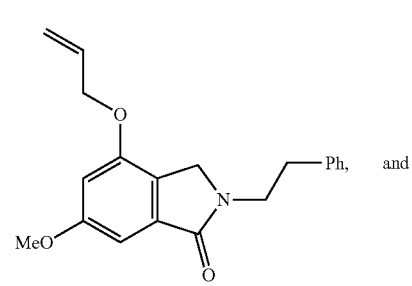

[Formula 4]

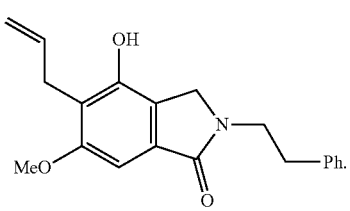

[Formula 5]

2. The compound of claim 1, wherein the compound comprises Formula 3 below:

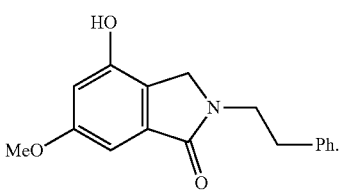

[Formula 3]

3. The compound of claim 1, wherein the compound comprises Formula 4 below:

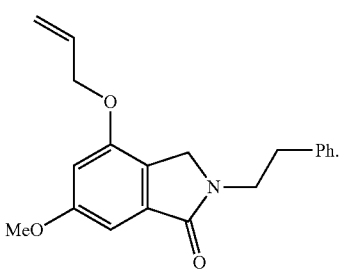

[Formula 4]

4. The compound of claim 1, wherein the compound comprises Formula 5 below:

[Formula 5]

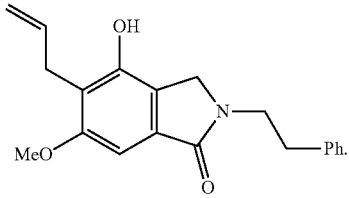

5. A process for preparing a compound of Formula 1 below, comprising
   (a) a step of preparing a compound of Formula 2 below by reacting a methyl 3-hydroxy-5-methoxybenzoate compound with phenylethylamine and formaldehyde; and
   (b) a step of preparing a compound of Formula 3 below by reacting the compound of Formula 2 below with an acid and then reacting with a base.

[Formula 1]

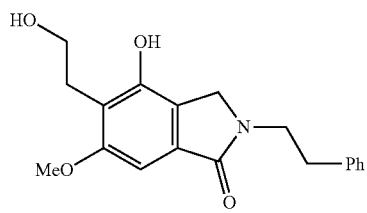

[Formula 2]

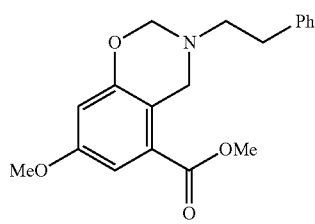

[Formula 3]

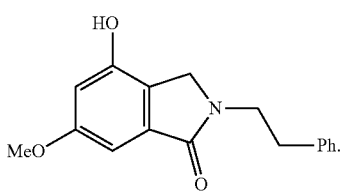

6. The process according to claim 5, further comprising
   (c) a step of preparing a compound of Formula 4 below by reacting the compound of Formula 3 below with an allyl halide.

[Formula 3]

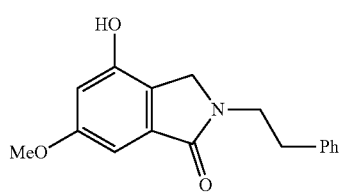

[Formula 4]

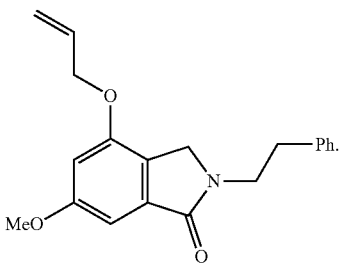

7. The process according to claim 6, further comprising
   (d) a step of preparing a compound of Formula 5 below by reacting the compound of Formula 4 below in mesitylene.

[Formula 4]

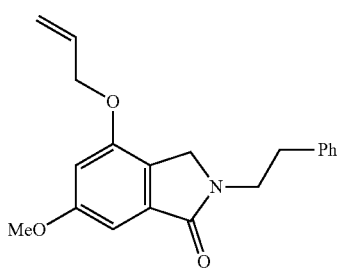

[Formula 5]

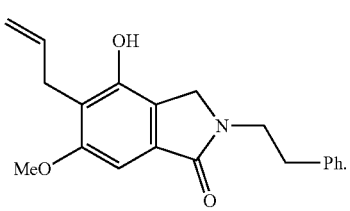

8. The process according to claim 7, further comprising
   (e) a step of preparing a compound of Formula 6 below by attaching a protecting group to a hydroxy group of the compound of Formula 5 below;
   (f) a step of preparing a compound of Formula 7 below by performing an oxidation reaction on the compound of Formula 6 below;
   (g) a step of preparing a compound of Formula 8 below by performing a reduction reaction on the compound of Formula 7 below; and
   (h) a step of preparing a compound of Formula 1 below by performing a deprotection reaction on the compound of Formula 8 below;

[Formula 1]

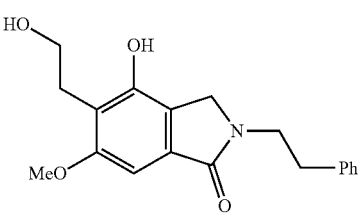

-continued

[Formula 2]
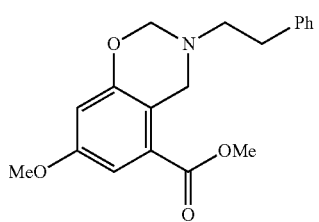

[Formula 3]
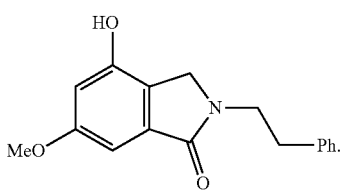

[Formula 4]
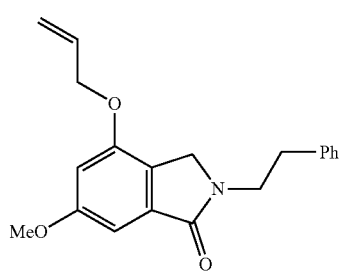

[Formula 5]
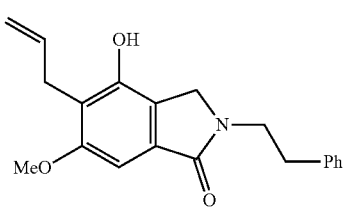

[Formula 6]
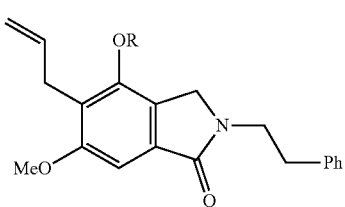

[Formula 7]
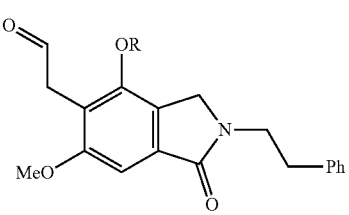

[Formula 8]
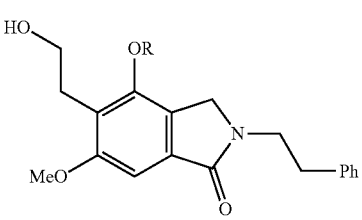

wherein R represents a benzoyl group, an acetyl group, a methoxymethyl group, an ethoxyethyl group, a methylthiomethyl group, a tert-butyl group, an allyl group, a tert-butyldimethylsilyl group, a tert-butyldiphenylsilyl group, a pivaloyl group, or a β-methoxyethoxymethyl group as a protecting group.

9. The process according to claim 5, wherein the acid is at least one selected from the group consisting of hydrochloric acid, sulfuric acid, phosphoric acid, nitric acid, sulfonic acid and p-toluenesulfonic acid, and the base is an aqueous sodium hydroxide solution or an aqueous potassium hydroxide solution.

10. The process according to claim 6, wherein the allyl halide is selected from the group consisting of allyl chloride, allyl bromide and allyl iodide.

11. The compound of claim 1, wherein the compound comprises Formula 2 below:

[Formula 2]
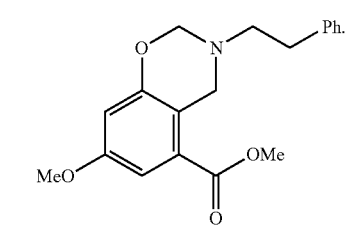

12. The process according to claim 8, wherein when the protecting group R is a tert-butyldimethylsilyl group, the compound of Formula 6, the compound of Formula 7, and the compound of Formula 8 are represented by Formula 6a, Formula 7a, and Formula 8a, respectively:

[Formula 6a]
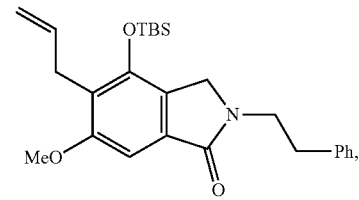

[Formula 7a]
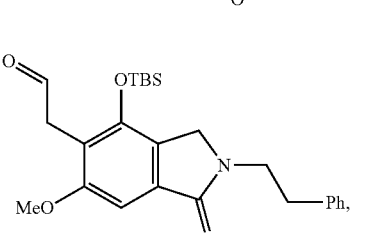

and

[Formula 8a]
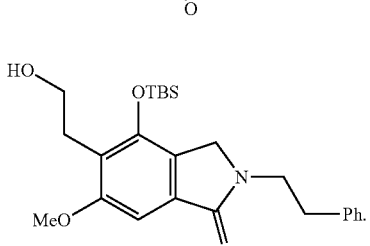

13. The process according to claim 8, wherein the deprotection reaction comprises a reaction of recovering a hydroxy group by removing the protecting group bonded with the hydroxy group on the compound of Formula 8.

14. The process according to claim 13, wherein the deprotection reaction comprises exposing the compound of Formula 8 to tetra-n-butylammonium fluoride.

\* \* \* \* \*